April 26, 1955    D. H. BALLANTYNE ET AL    2,706,888
PUMP ARRANGEMENTS FOR GAS-TURBINE ENGINE FUEL SYSTEMS
Filed March 6, 1950
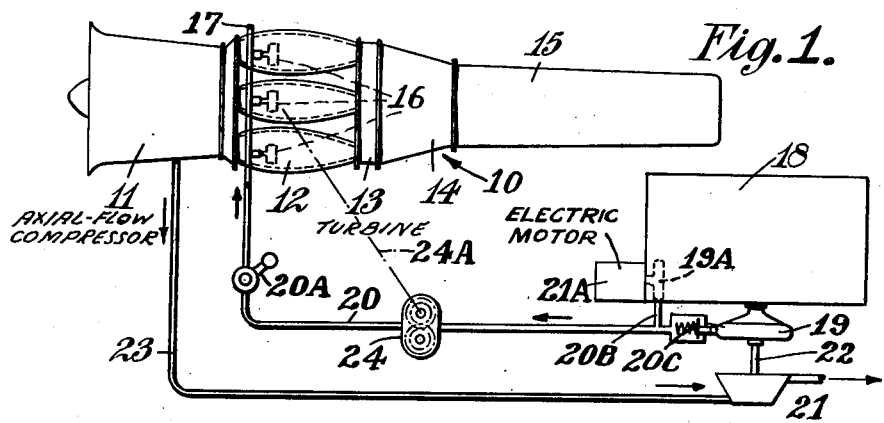
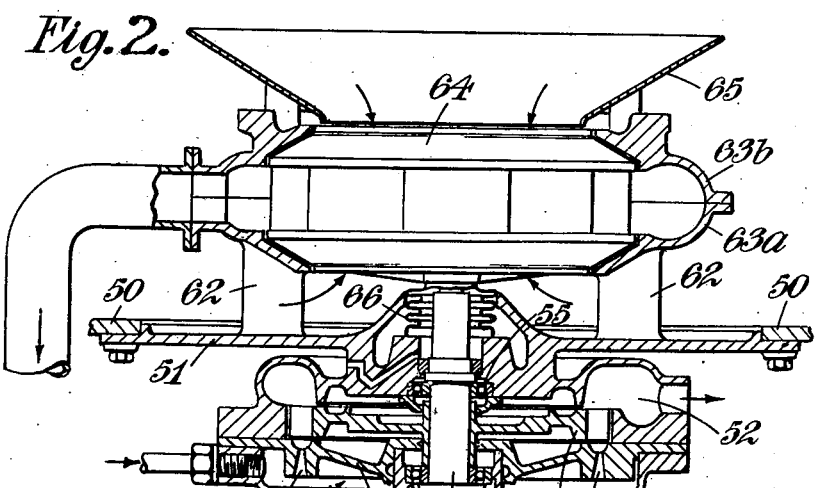
INVENTORS
DAVID H. BALLANTYNE
DAVID O. DAVIES
DESMOND E. BOWNS
BY Wilkinson & Mawhinney
ATTY'S United States Patent Office 2,706,888
Patented Apr. 26, 1955

2,706,888

PUMP ARRANGEMENTS FOR GAS-TURBINE ENGINE FUEL SYSTEMS

David Havelock Ballantyne, Littleover, David Omri Davies, Edgware, and Desmond Edward Bowns, Nottingham, England, assignors to Rolls-Royce Limited, Derby, England, a British company Application March 6, 1950, Serial No. 147,893

Claims priority, application Great Britain March 10, 1949

3 Claims. (Cl. 60—39.28)

This invention relates to gas-turbine engine fuel-systems, and includes such systems when installed in aircraft for the purpose of effecting a main supply of fuel.

A gas-turbine engine normally comprises a compressor system driven by a turbine system, which compressor system delivers air to main combustion equipment in which liquid fuel is burnt, such fuel being supplied by a system which is hereafter referred to as "the main fuel supply system."

It is the practice in certain gas-turbine installations to provide a booster pump for pressurising the fuel at the entry to a fuel pump of a main or auxiliary fuel supply system. Hitherto booster pumps have been electrically driven, and in the case of aircraft installations, have been located close to or built into the aircraft fuel tanks. In the case of gas-turbine power-plant installations of high-powered aircraft, an installation having electrically driven booster pumps has an excessive weight and size owing to the necessity of catering for large rates of fuel flows.

It is an object of the present invention to provide a main fuel supply system for a gas-turbine engine installation of which the installation and control is facilitated, particularly when the engine or engines is or are employed for aircraft propulsion purposes.

Another object of the present invention is to provide an improved fuel supply system for a gas-turbine power-plant installation in which a fuel tank is remote from the gas turbine.

The air motor used in accordance with the invention preferably comprises an impulse wheel but may be a vane or piston motor. The fuel pumps driven thereby are preferably of the centrifugal or screw impeller kind, although gear or reciprocating piston pumps may be used.

A fuel system according to this invention will now be described with reference to the accompanying drawing in which:

Figure 1 illustrates the fuel system diagrammatically, and

Figure 2 illustrates a form of air-motor-driven pump suitable for use in the fuel system.

Referring to Figure 1, there is illustrated a gas-turbine engine 10 of the jet propulsion type suitable for use in aircraft. The engine comprises a compressor 11, illustrated as an axial-flow compressor, combustion equipment 12, illustrated as comprising a series of separate combustion chambers, a turbine 13 and an exhaust assembly 14 leading to a jet-pipe 15.

Air is compressed in compressor 11 and delivered into the combustion equipment 12 wherein fuel is burnt, and the heated air passes from the combustion equipment into the turbine 13 to drive it and then into the exhaust assembly 14 and jet-pipe 15. The turbine drives the compressor by a shaft (not shown) extending centrally through the combustion equipment.

Fuel is delivered into the combustion equipment 12 by fuel injectors 16 which are connected to a supply manifold 17.

In this embodiment, the main fuel supply system for delivering fuel to the injectors 16 comprises a number of fuel tanks 18 of which one fuel tank is shown. Fuel is drawn from each tank by a booster pump, illustrated as a centrifugal pump 19, to be delivered to an engine-driven main fuel pump 24 the drive being indicated at 24A. From the pump 24 the fuel passes through throttle valve 20A to the manifold 17.

The pump 19 is located remote from the engine and is preferably located in the tank 18 although, for convenience, it is shown externally thereof.

The pump 19 is driven by an air motor, illustrated as a turbine 21, through a shaft 22 which when the pump is located in the tank 18 will extend through the wall of the tank 18.

The pressure air supply for operating the motor 21 is taken from any convenient point in the engine and is illustrated as being taken from the delivery end of compressor 11 and conveyed to the motor through conduit 23.

During starting of the power plant, the air pressure supply to the air motor 21 is not available, and the pump 19 cannot therefore be driven to supply fuel to the pump 24. In order that the pump 24 shall be supplied with fuel during starting, a small capacity tank pump 19A, driven an electric motor indicated at 21A is incorporated in the power plant installation.

The pump 19A delivers to supply line 20 through branch pipe 20B and a non-return valve 20C is provided to prevent flow of fuel back through pump 19.

One suitable construction of booster pump 19 is illustrated in Figure 2. In this figure, the wall of a fuel tank is indicated at 50. An aperture is provided in the wall and the aperture is closed by a plate 51.

The plate 51 has formed on its outer surface and integrally with it an exhaust scroll 52 of an air-impulse turbine, the rotor disc 53 of which is carried on a shaft 54 mounted in bearings 55 accommodated centrally of the scroll 52 and in bearings 56 housed in an internal hollow boss 57 on a cover plate 58 of the turbine.

A plate 59 formed with a series of nozzles 60 is located between the cover plate 58 and the rotor disc 53. The space 61 between the plate 59 and the cover plate 58 forms an air distribution chamber for the nozzles 60.

Mounted on the inner surface of the plate 51 by means of standards 62, there is one part 63a of the casing of a double-entry centrifugal pump, the impeller 64 of which is of the shrouded type. The other part 63b of the casing is secured to the part 63a and carries a conical member 65 forming the inlet to upper eye of the impeller. The impeller 64 is secured on an extension of the shaft 54 of the turbine rotor disc 53 to rotate therewith. A flexible metal bellows type legging 66 is located in cavity in the plate 51 and is secured at its lower end to the plate. The upper end of the legging 66 carries a washer member bearing on the hub of the impeller 64. The legging 66 acts to prevent leakage of fuel along the shaft 54.

The air pipes 23 may be connected directly to any convenient point of the gas-turbine engine to receive air compressed by the compressor 11. In certain cases, however, it may be desirable to employ air preheated to a moderate temperature, say 300°–400° C. for driving the air motors to avoid icing up of the air motors due to the refrigeration effect caused by expansion of the air in the air motor. In such a case the supply pipes 23 may be connected for instance with the space which exists in the usual form of combustion equipment between the flame tube and outer air casing of each combustion chamber.

In general, however, it is desirable to avoid using combustion products having an excessively high temperature since heat-insulated or high-temperature resistant ducting to the air motor would have to be provided. Thermal losses in the ducting may, however, make it desirable to provide some degree of preheat, additional to that occasioned by the temperature rise of compression in the compressor, to avoid icing difficulties on the exhaust side of the air motor or turbine.

We claim:

1. In a gas-turbine power-plant installation whereof a gas-turbine comprises a compressor system, combustion equipment connected to receive air direct from said compressor system and a turbine connected to receive products of combustion direct from said combustion equipment, a fuel-system for supplying fuel to a gas-turbine engine comprising a fuel tank arranged remote from said engine, a fuel pump for delivering fuel from said tank into the engine, said fuel pump being remote from said engine and adjacent the wall of the fuel tank, an air motor connected to said engine to receive air compressed by said compressor system to be driven thereby and arranged to drive said fuel pump, and an electrically-driven booster pump connected between said engine and said tank in parallel with said fuel pump to deliver fuel from said tank to said engine during starting of the power plant, said electrically-driven pump having a capacity which is small compared with that of the air-motor-driven fuel pump.

2. In a gas-turbine power-plant installation, a fuel system for supplying fuel to a gas-turbine engine having a compressor system, combustion equipment connected to receive air direct from said compressor system and a turbine connected to receive products of combustion direct from said combustion equipment, said fuel system comprising a fuel tank located remote from said engine, a fuel pump remote from said engine and adjacent the wall of said fuel tank and having its inlet connected to said tank, an air motor connected to said pump to drive it, an air duct between the discharge of said compressor system and said air motor to supply compressed air to said air motor, a discharge conduit from said fuel pump, a main pump connected to said discharge conduit to take suction therefrom, a drive connection between said gas-turbine engine and said main pump, a main fuel pipe connected to said main pump to receive the discharge therefrom, burners in said combustion system connected to said main fuel pipe to receive fuel therefrom, a shut-off cock in said main fuel pipe between said burners and said main pump, a branch conduit from said discharge conduit between said main pump and said fuel pump, an auxiliary pump connected to said branch conduit to discharge into it and arranged to take suction from said fuel tank, an electric motor connected to said auxiliary pump to drive it, and a non-return valve in said discharge conduit between said branch conduit and said fuel pump permitting flow from said fuel pump.

3. In a gas turbine power plant installation, a fuel system for supplying fuel to a gas turbine engine having a compressor system, combustion equipment connected to receive air direct from said compressor system, and a turbine connected to receive products of combustion direct from said combustion equipment, said fuel system comprising a fuel tank located remote from said engine, a centrifugal fuel pump remote from said engine and adjacent the wall of said fuel tank, the pump having its inlet directly connected to the tank and having a rotor, an air turbine having a rotor co-axial with said centrifugal fuel pump rotor and adjacent thereto, a shaft directly interconnecting the rotors of said pump and turbine, an air duct between said compressor system and said air turbine to supply compressed air to said air turbine, a discharge conduit from said centrifugal fuel pump, a main positive-displacement pump having its inlet connected to said discharge conduit to receive fuel therefrom, a mechanical drive connection between said gas turbine engine and said main positive-displacement pump, a main fuel pipe connected to said main pump to receive the discharge therefrom and burners in the said combustion equipment connected to said main fuel pipe to receive fuel therefrom.

References Cited in the file of this patent

UNITED STATES PATENTS

| Number | Name | Date |
|---|---|---|
| 1,040,350 | Keys | Oct. 8, 1912 |
| 1,815,097 | Davidson | July 21, 1931 |
| 2,330,558 | Curtis | Sept. 28, 1943 |
| 2,351,750 | Fawkes | June 20, 1944 |
| 2,487,842 | Whiteman et al. | Nov. 15, 1949 |
| 2,506,611 | Neal et al. | May 9, 1950 |
| 2,520,967 | Schmitt | Sept. 5, 1950 |
| 2,540,594 | Price | Feb. 6, 1951 |
| 2,551,229 | Alford et al. | May 1, 1951 |
| 2,566,373 | Redding | Sept. 4, 1951 |
| 2,611,239 | Briggs | Sept. 23, 1952 |
| 2,612,020 | Griffith | Sept. 30, 1952 |